(12) United States Patent
Lamberti et al.

(10) Patent No.: US 8,733,746 B1
(45) Date of Patent: May 27, 2014

(54) VEHICULAR SUSPENSION ENHANCEMENT

(75) Inventors: Gerard Lamberti, Carpinteria, CA (US); Michael Savage, Washington, PA (US)

(73) Assignee: Supersprings International, Inc., Carpinteria, CA (US)

( * ) Notice: Subject to any disclaimer, the term of this patent is extended or adjusted under 35 U.S.C. 154(b) by 586 days.

(21) Appl. No.: 12/509,700

(22) Filed: Jul. 27, 2009

Related U.S. Application Data

(60) Provisional application No. 61/084,169, filed on Jul. 28, 2008.

(51) Int. Cl.
*B60G 11/22* (2006.01)
*F16F 1/44* (2006.01)

(52) U.S. Cl.
USPC .......................................... 267/292; 267/141

(58) Field of Classification Search
USPC .............. 267/140.4, 141, 151, 152, 153, 291, 267/292, 293; 248/560, 638
See application file for complete search history.

(56) References Cited

U.S. PATENT DOCUMENTS

| | | | | |
|---|---|---|---|---|
| 3,203,361 | A | * | 8/1965 | Sharp ................................ 410/26 |
| 3,396,963 | A | * | 8/1968 | Hutchins ........................ 267/153 |
| 3,477,674 | A | * | 11/1969 | Schaller ......................... 248/615 |
| 3,625,501 | A | * | 12/1971 | Hein et al. ..................... 267/153 |
| 3,730,550 | A | * | 5/1973 | Thaxton .................. 280/124.163 |
| 3,814,412 | A | * | 6/1974 | Britton et al. ................. 267/152 |
| 4,615,513 | A | * | 10/1986 | Thaung et al. ................. 267/292 |
| 4,735,970 | A | | 4/1988 | Sommerfeld et al. |
| 4,745,135 | A | * | 5/1988 | Thomas et al. ................ 521/114 |
| 5,021,534 | A | * | 6/1991 | Kawasaki et al. ............... 528/60 |
| 5,295,755 | A | * | 3/1994 | DeHaan et al. ............... 403/291 |
| 5,518,227 | A | * | 5/1996 | Whelan .......................... 267/153 |

FOREIGN PATENT DOCUMENTS

JP 571842 A * 1/1982

OTHER PUBLICATIONS

Firestone Industrial Products Company, Air Spring Warranty Evaluation Criteria (AWEC07 4 page brochure), copyright 2007.
Timbren Industries Inc., Aeon Hollow Rubber Springs, from webpage http://www.timbren.com/aeon-spring-typical-uses.htm, copyright 1996-2007.
Bayer Materialscience, pp. 1, 13 and 23 taken from BaySystems customized polyurethanes 24 page brochure, Edition: Feb. 2007.
Bayer Material Science, Vulkollan webpage http://www.bayer-baysystems.com/bms/baysystems.nsf/id/01_LEV_EN_Vulkollan#, copyright unknown.
Bayer Material Science, Cellular Vulkollan webpage http://www.bayer-baysystems.com/bms/baysystems.nsf/id/01_LEV_EN_Cellular_Vulkollan?open&I=01_LEV_EN, copyright unknown.

* cited by examiner

*Primary Examiner* — Melody Burch
(74) *Attorney, Agent, or Firm* — Ralph D. Chabot

(57) ABSTRACT

A vehicular suspension enhancement that comprises the addition of a pair of cellular polyurethane elastomer cylindrical shaped springs, one located on each side of an axle. Each spring is operatively attached between the axle and the vehicular frame and made from a cast of cellular polyurethane elastomer derived from a polyol diisocyanate mixture containing naphthalene-1,5-diisocyanate (NDI)-terminated prepolymer and a polyol selected from the group consisting of polyether polyol, polyester polyol, or a combination thereof.

5 Claims, 1 Drawing Sheet

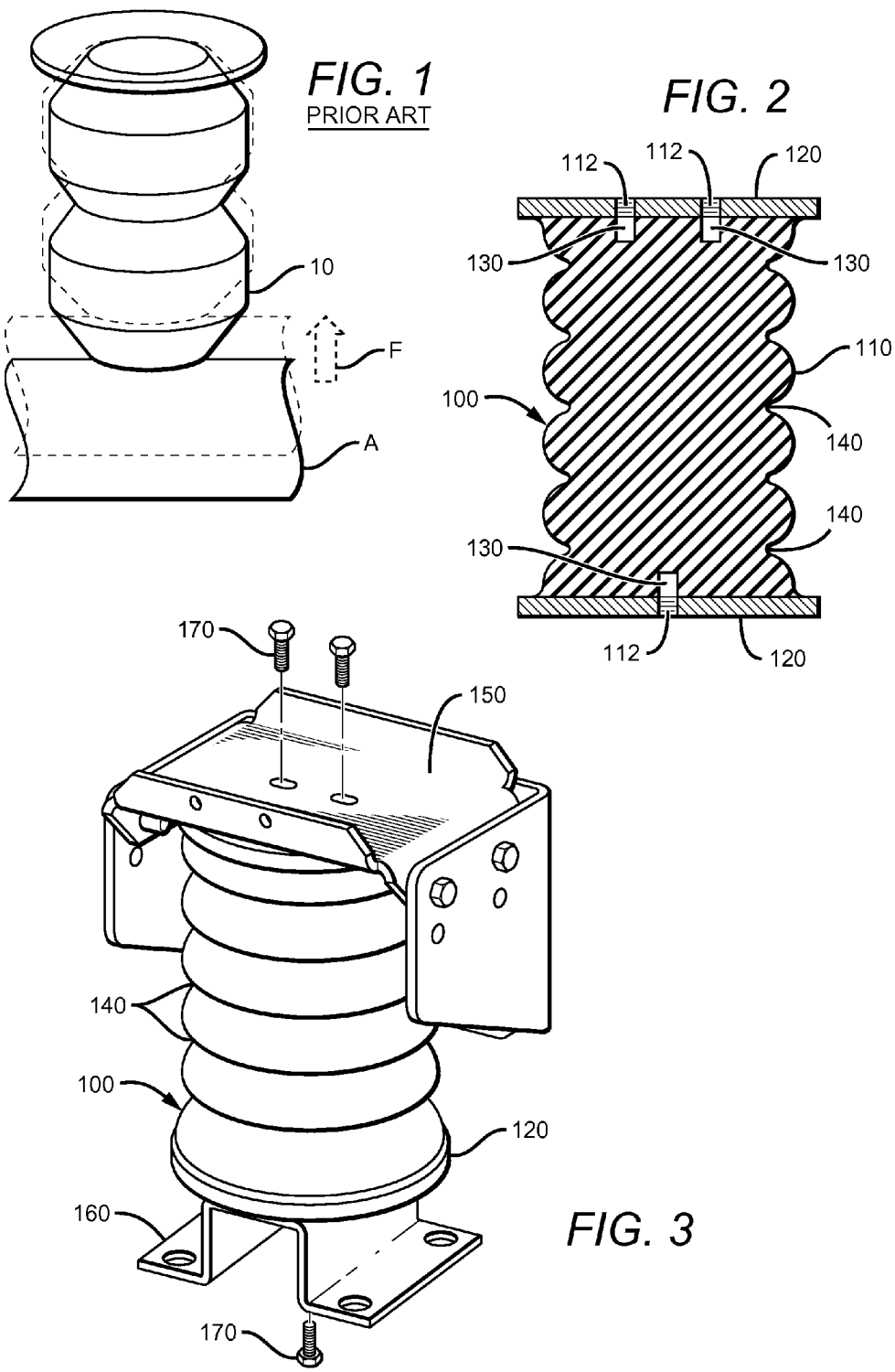

VEHICULAR SUSPENSION ENHANCEMENT

CROSS REFERENCE TO RELATED APPLICATIONS

This application claims benefit as a continuation-in-part of U.S. Provisional Application No. 61/084,169, filed Jul. 28, 2008, the entire content of which is hereby incorporated by reference herein in its entirety for all purposes.

BACKGROUND OF THE INVENTION

Vehicular suspensions are well known for providing a smoother and more comfortable ride for driver and passengers. A typical embodiment utilizes springs, providing support for the suspension; and shock absorbers, providing damping, both of which are operatively attached between the axle and vehicular chassis frame. When traveling upon a rough road or off-road terrain, the vehicle wheels and axles begin to oscillate up and down; the frequency increasing with increased velocity of the vehicle. This oscillation is facilitated by the vehicle's suspension system which determines the extent of vertical travel distance and degree of driver comfort.

Additionally, when a vehicle is heavily loaded, the supporting springs compress downward upon the rear end causing the front end of the vehicle to rise. This downward movement upon the rear axle reduces the vertical travel range of the rear suspension substantially causing any installed rear bump-stops or limiters to become activated which could detrimentally affect occupant ride quality. The rear end sag also negatively impacts steering control and handling as the vehicular load is not properly distributed between front and rear suspensions.

Furthermore, pick-up truck manufacturers presently are designing trucks with the ride quality of a sedan in an effort to attract a broader customer base. To achieve this additional level of ride comfort, leaf spring-packs have been substantially lengthened. The drawback is that longer spring-packs do not support as heavy a load as do shorter spring-packs. Also, longer spring-packs are susceptible to increased lateral twisting which translates into an increased likelihood of body roll. Many drivers do not carry substantial loads and these concerns do not become an issue. However, for vehicles which do carry heavy loads, the longer spring-packs become a detrimental feature and a suspension enhancement becomes a necessity.

An example of a prior art suspension enhancement is a product marketed by Timbren Industries Inc., Ajax, Ontario, Canada, which is illustrated in FIG. 1. This suspension enhancement comprises an extended hollow cylindrical-shaped piece of resilient rubber 10 which replaces the factory bump-stop and is attached on the top end to the vehicular chassis frame (not shown) and is not in contact with axle A when an upward force is not applied to the axle. However, when a sufficient upward force F is applied to axle A, it will displace in the upward vertical direction and compress rubber 10 as shown by the dashed lines of FIG. 1. This compression of hollow rubber body 10 provides additional suspension support. The rubber is not attached to the axle because oscillation in the downward direction would undesirably stretch the rubber piece causing it to fatigue and prematurely fail. As a result, this suspension enhancement addresses only the upward stroke of the axle. However, undesired increased downward rebound occurs which requires increased damping from the shocks. Also, due to its construction from high durometer rubber, the engagement is typically harsh.

A second example of a prior art suspension enhancement is a product marketed by Air Lift Company, Lansing, Mich. This suspension enhancement comprises an inflatable bellows operatively positioned and attached on the top end to the vehicle chassis frame and on the bottom directly to the axle or via the suspension spring. The pressure within the bellows is adjustable.

Although ride comfort is enhanced by the air bag being in continuous operative contact with the axle and frame, this embodiment suffers from a number of problems. One is that the internal bellows pressure will reduce over time as a result of leakage. Another problem is that the bellows suspension enhancement systems are susceptible to rupture failure when not properly maintained. Under-inflation can lead to excessive wear internally and eventual failure by rupture of the air bladder. Over-inflation can cause high point loading on the frame and lead to possible frame damage. Over inflation also detracts from the factory-installed suspension and often results in a hard, uncomfortable ride. Finally, although the air suspension enhancement is operatively attached on the top to the frame and on the bottom to the axle and can handle compression loads for a limited period of time without maintenance, downward extension of the axle places a stress upon the air bag system for which it was not designed. Typically, air bag systems are not recommended for stretching in excess of 15% of its length.

Polyurethane elastomers have been used for many years in applications requiring increased deformability and reduced compression hardness. A process for production of cellular polyurethane is described in U.S. Pat. No. 4,735,970. Cellular polyurethane elastomers, such as cellular VUKOLLAN®, manufactured under license from Bayer Aktiengesellschaft, has also been used in the automotive sector; particularly for use in the manufacture of struts which provide desirable progressive spring characteristics.

SUMMARY OF THE INVENTION

A vehicular bolt-on suspension enhancer comprising a cellular polyurethane elastomeric spring body is disclosed which improves upon the prior art embodiments to provide a more efficient load support system for heavy loaded vehicles or vehicles traveling on rough roads or off-road. The resilient cellular polyurethane elastomeric spring body made according to the invention is capable of being repeatedly compressed 70% and repeatedly stretched to 130% of its unstressed length.

A mounting means specifically designed for the make and model of vehicle is used to operatively position the suspension enhancer between a vehicle's frame and axle or between frame and suspension spring. The mounting means comprises at least two mounting brackets and associated screws and nuts to operatively position the spring enhancer and secure between axle and frame. The suspension enhancer can be manufactured for use with either or both front and rear axle suspensions.

Because automotive manufacturers use non-conforming designs, a single configuration for our suspension enhancement is not possible. The precise configuration of the spring enhancer and mounting means will be dependent on the suspension-frame specifications of the particular make and model of vehicle for installation and space between axle and frame. At the very least, the height and width of the cylindrical spring enhancer must be of sufficient mass to permit the mechanical properties of the cellular polyurethane elastomeric body to absorb the compressive forces without failure and function as a damping enhancement. The height should be between about 6-9 inches and the width between about 4-7 inches. Preferably, proper operative position preloads the enhancer in an at-rest condition. Proper installation requires that a pair of suspension enhancers be installed per axle; i.e. one for the right side and the other for the left. Preferably, one top and one bottom mounting bracket are used, each made from steel.

Each suspension enhancer is of a general cylindrical shape and comprised of a casted cellular polyurethane body derived from naphthalene-1,5-diisocyanate (NDI)-terminated prepolymer and a polyol selected from the group consisting of polyether polyol, polyester polyol, or a combination thereof. The process used for the production of the cellular polyurethane component is described in U.S. Pat. No. 4,735,970, which is hereby incorporated by reference.

Bonded to the elastomeric body during the casting process is a pair of shaped end plates; one plate bonded to a respective end of the polyurethane elastomeric body. In a preferred embodiment, the spring body includes at least one circumferential convolution.

The end plates of the suspension enhancer provide structural support to the cylindrical body when operatively positioned to the vehicle using the mounting means. Preferably, threaded holes which are used to frictionally engage respective screws used for attaching the suspension enhancer to the mounting means are created as part of the casting process. Alternatively, holes can be drilled into either end of the body subsequent to casting.

Because of the resiliency characteristics of cellular polyurethane elastomer derived from a polyol diisocyanate mixture using naphthalene-1,5-diisocyanate (NDI)-terminated prepolymer and polyol selected from the group consisting of polyether polyol, polyester polyol, or a combination thereof, each casted cylindrical body is capable of 70% compression as well as 130% extension making it an exceptional product for suspension enhancement and an improvement over prior art suspension enhancement embodiments. By contrast, the prior art air-bag system is capable of about 50% compression and about 15% extension.

Because our cellular polyurethane elastomeric suspension enhancement remains in contact throughout the vertical oscillation of the attached axle, damping of the oscillation is maximized resulting in optimum comfort for the vehicle occupants. It should be noted that the prior art air-bag system, because it is attached to both the vehicle chassis and suspension, will dampen the oscillation within a limited range of oscillation. However, in more demanding situations where its compression and extension cycles are severe, the air bag will be prone to premature failure as discussed earlier.

Spike loading is a term well known in the art and pertains to inadvertent conditions which place a high differential on the respective springs of the same axle, can easily occur in demanding situations. By way of example, spike loading can occur when one tire becomes excessively elevated relative to the other tire on the same axle as is the case when traversing a deep pothole.

The cellular polyurethane elastomeric spring is formed by a hot casting process which uses water as a blowing agent to create encapsulated areas of gas, typically carbon dioxide as part of the casted product. The hot casting process is well known in the prior art and will not be discussed further herein.

The density range for the cast cellular polyurethane elastomeric body will be between 0.35-0.60 g/cc. A density closer to 0.35 g/cc is more suitable for a lighter load condition while a density closer to 0.60 g/cc is more suitable for a heavy load applications.

In a preferred embodiment, the resilient cast body consists essentially of cellular polyurethane derived from a polyol diisocyanate mixture containing naphthalene-1,5-diisocyanate (NDI)-terminated prepolymer and polyol selected from the group consisting of polyether polyol, polyester polyol, or a combination thereof made in accordance with U.S. Pat. No. 4,735,970. The cylindrical body has a density of between 0.35-0.60 g/cc and is capable of being compressed 70% and stretched to 130% of its unstressed. Most preferably, DESMODUR® polyisocyanate manufactured by Bayer Aktiengesellschaft is used as the NDI constituent. The polyol molecular weight is preferably in the range of 1500 to 2500 and most preferably about 2000.

The casted product is a cellular polyurethane elastomeric structure, preferably made in accordance with the requirements for manufacture of VULKOLLAN® under license from Bayer Aktiengesellschaft, resulting from the aforementioned hot casting process.

Our casted suspension enhancer is capable of enduring high dynamic stress with minimal permanent deformation and exhibits a high degree of abrasion resistance. Because of its chemical structure, the cellular polyurethane elastomeric spring is resistant to water absorption and performance will not be compromised in high humidity or aqueous conditions. Because of its gas encapsulated cellular structure, there is reduced transverse expansion during compression.

The polyurethane elastomeric body exhibits progressive compression strain behavior up to at least 11,000 lb compressive load, i.e., the compression rate is low with less compression force and the compression rate progressively increases with a higher compression force; this non-linear relationship is a desirable characteristic for ride comfort. Finally, because of its chemical composition, the cellular polyurethane elastomeric body can properly function in a temperature range of between –40 F to 200 F which encompasses most, if not all vehicular driving conditions.

Our suspension enhancer is essentially maintenance free. The cellular polyurethane elastomeric is self supporting unlike airbags which require air for support there is no dissipation of gas which is an inherent problem for air bag embodiments.

Damage resulting from off-road driving is substantially non-existent. The cellular polyurethane elastomeric body can be severely punctured with little or no loss of performance.

Installation is simple; incorporating a bracket designed to attach to the frame of a specific vehicle model and another bracket designed to attach to the axle or suspension spring.

BRIEF DESCRIPTION OF THE DRAWINGS

FIG. 1 is a prior art vehicular suspension embodiment.
FIG. 2 is a side view illustration of the suspension enhancer made according to the invention.
FIG. 3 is a perspective view of the suspension enhancer of FIG. 2 positioned between mounting brackets.

DETAILED DESCRIPTION OF THE PREFERRED EMBODIMENT

FIG. 2 illustrates the suspension enhancer 100 of the present invention. Suspension enhancer 100 comprises a casted substantially cylindrical body 110 having a pair of shaped end plates 120 of 0.38" thickness. Cylindrical body 110 consists essentially of a cellular polyurethane elastomer derived from naphthalene-1,5-diisocyanate (NDI)-terminated prepolymer.

As part of the hot casting process for production of cellular polyurethane described in U.S. Pat. No. 4,735,970, end plates 120 are positioned within the mold and become bonded to cellular polyurethane elastomeric cylindrical body 110. End plates 120 are sized appropriately to have a slightly larger diameter than cylindrical body 110. End plates further have apertures for receiving the threaded stems of bolts or screws (not shown).

A naphthalene-1,5-diisocyanate (NDI)-terminated prepolymer, namely DESMODUR®, a polyisocyanate manufactured by Bayer Aktiengesellschaft and a polyol selected from the group consisting of polyether polyol, polyester polyol, or a combination thereof are blended to form a polyol diisocyanate mixture. The polyol molecular weight is preferably in the range of 1500 to 2500 and most preferably about 2000.

The polyol diisocyanate mixture used to form the cellular VULKOLLAN® product spring body; the chemical composition of spring body 110 made under license from Bayer Aktiengesellschaft.

As part of the casting process, screws are positioned through apertures 112 of end plate 120 having the stem portions extending into the mold. Following the casting process and after cylindrical body 110 cures, the screws are removed, thus creating the threaded apertures 130 within cylindrical body 110. Cylindrical casted body 110 includes a plurality of circumferential convolutions 140.

Following the hot casting process, a cyclic process occurs where suspension enhancer 100 rests at ambient conditions for 7 days and is then placed into an oven at 230 F for 16-24 hours then removed from the oven, resting at ambient conditions. The product is then returned to the oven and the cyclic heating and cooling process is repeated for a total of 4 cycles. This optimizes dynamic performance, tensile strength and abrasion resistance and is in accordance with the manufacturing requirements for the caster to produce a VULKOLLAN® product under license from Bayer Aktiengesellschaft.

Once the heating/cooling process has completed, suspension enhancer 100 is ready for installation. The exact dimensions of suspension enhancer 100 and the associated mounting means, which comprises mounting brackets 150 and 160 and associated screws and nuts, are dependent upon the particular make and model of vehicle. However, a typical configuration for spring enhancer 100 would have the diameter of the cylindrical body being approximately 6 inches and the height being approximately 7.5 inches.

As best illustrated in FIG. 3, suspension enhancer 100 is disposed between a mounting means, namely brackets 150 and 160 and held in place to the brackets by screws 170 threadably engaging a respective threaded aperture 130. The mounting means comprises bracket 150 mounting to a vehicle frame and bracket 160 for mounting to a vehicle axle or to a respective vehicle suspension spring. Two suspension enhancers 100 are required to be operatively positioned between an axle and frame; the suspension enhancers located near opposing sides of the axle. The mounting means and the suspension enhancers are appropriately sized to be operatively positioned within the available space located between the axle and frame of the particular make and model of vehicle.

We claim:

1. A vehicular suspension enhancer for installation in a space between the axle and frame of a vehicle comprising:
   a spring formed by a hot casting process consisting essentially of a cellular polyurethane elastomer said spring having a top end and a bottom end, both of said ends having at least one threaded aperture for engaging a respective threaded stem of a bolt or screw; said spring made from at least one isocyanate mixture and a polyol selected from the group consisting of polyether polyol, polyester polyol, or a combination thereof; with water used as a blowing agent during the hot casting process to achieve a density for said spring of between 0.35-0.60 g/cc;
   a pair of end plates; each end plate bonded to a respective side of said spring; and each end plate further having an aperture for alignment with a respective said threaded aperture; and,
   where said spring can be compressed 70% and stretched to 130% of its unstressed length when one end plate is mounted to the frame and the other end plate is mounted to the axle.

2. The vehicular suspension enhancer of claim 1 where said at least one isocyanate mixture is a polyol diisocyanate mixture containing naphthalene-1,5-diisocyanate (NDI)-terminated prepolymer.

3. The vehicular suspension enhancer of claim 1 further comprising a first bracket configured for attachment to the vehicular frame and a second bracket configured for attachment to the axle; where each of said brackets have at least one aperture, each having a common axis of symmetry with a respective end plate aperture and spring aperture for using a screw to secure a respective bracket to said spring.

4. A suspension system for a vehicle having a frame, an axle for supporting at least one tire on either end and a pair of shock absorbers mounted to the axle and frame, wherein the improvement comprises:
   a pair of vehicle suspension enhancers mounted to the frame and axle, each of said suspension enhancers mounted near a respective end of an axle, each suspension enhancer comprising:
   a casted cellular polyurethane elastomeric spring body formed by a hot casting process utilizing a polyol diisocyanate mixture containing naphthalene-1,5-diisocyanate (NDI)-terminated prepolymer and polyol selected from the group consisting of polyether polyol, polyester polyol, or a combination thereof with water used as a blowing agent during the hot casting process to achieve a density for said spring body of between 0.35-0.60 g/cc;
   a pair of end plates, each end plate bonded to a respective side of said spring body, one end plate mounted to the frame and the other end plate mounted to the axle; and,
   where said spring body can be compressed 70% and stretched to 130% of its unstressed length.

5. A vehicular suspension enhancer for operative attachment and located in a space between the frame and axle of a vehicle, the suspension enhancer comprising:
   a) a resilient casted cylindrical body consisting essentially of cellular polyurethane derived from a polyol diisocyanate mixture containing naphthalene-1,5-diisocyanate (NDI)-terminated prepolymer and polyol selected from the group consisting of polyether polyol, polyester polyol, or a combination thereof, said cylindrical body having a density of between 0.35-0.60 g/cc; where said resilient casted cylindrical body is capable of being compressed 70% and stretched to 130% of its unstressed height and,
   b) a pair of end plates; each end plate bonded to a respective end of said cylindrical body, where one end plate is mounted to the frame and the other end plate is mounted to the axle.

* * * * *